(12) United States Patent
Pahrmann

(10) Patent No.: US 10,514,388 B2
(45) Date of Patent: Dec. 24, 2019

(54) HANDS-FREE ATTACHABLE WIND DETECTION DEVICE

(71) Applicant: John Pahrmann, Poulsbo, WA (US)

(72) Inventor: John Pahrmann, Poulsbo, WA (US)

( * ) Notice: Subject to any disclaimer, the term of this patent is extended or adjusted under 35 U.S.C. 154(b) by 0 days.

(21) Appl. No.: 16/139,822

(22) Filed: Sep. 24, 2018

(65) Prior Publication Data

US 2019/0033339 A1 Jan. 31, 2019

Related U.S. Application Data

(63) Continuation-in-part of application No. 16/045,664, filed on Jul. 25, 2018, now abandoned.

(60) Provisional application No. 62/536,952, filed on Jul. 25, 2017.

(51) Int. Cl.
| | | |
|---|---|---|
| *G01P 13/02* | (2006.01) | |
| *G01P 5/00* | (2006.01) | |
| *G01P 13/00* | (2006.01) | |
| *F41B 5/14* | (2006.01) | |

(52) U.S. Cl.
CPC .............. *G01P 13/02* (2013.01); *F41B 5/148* (2013.01); *G01P 5/001* (2013.01); *G01P 5/005* (2013.01); *G01P 13/0093* (2013.01); *F41B 5/1442* (2013.01)

(58) Field of Classification Search
CPC .......... G01P 13/02; G01P 13/025; G01P 5/02; G01P 13/045; G01P 5/12; G01P 5/20; G01P 5/06; G01P 5/07; G01P 5/14; G01P 5/26; G01P 13/006; G01P 13/0093; G01P 5/00; G01P 5/005; G01P 5/04; G01P 5/165; G01P 5/245; G01P 13/0006; G01P 13/0013; G01P 13/002; G01P 13/0066; G01P 5/001; G01P 5/10; G01P 5/24; G01P 13/00; G01P 13/0033; G01P 21/025; G01P 5/16; G01P 5/18; G01P 7/00; G01W 1/00; G01W 1/02; G01W 2001/003; G01W 1/04; G01W 1/08; G01W 1/10
USPC .......................................... 73/170.01–170.05
See application file for complete search history.

(56) References Cited

U.S. PATENT DOCUMENTS

| | | | |
|---|---|---|---|
| 5,186,118 A * | 2/1993 | Stinson ................. | A01M 31/00 116/214 |
| 6,550,418 B2 | 4/2003 | Williamson | |
| 6,742,723 B2 | 6/2004 | Felegy | |
| 7,765,863 B1 * | 8/2010 | Woolsey ................... | G01P 5/20 73/170.04 |
| 2002/0139290 A1 * | 10/2002 | Williamson ........... | A63B 57/00 116/200 |
| 2010/0186496 A1 * | 7/2010 | Galley ................... | G01P 13/006 73/170.06 |
| 2010/0224119 A1 | 9/2010 | Morris | |
| 2012/0247201 A1 * | 10/2012 | Bibby ................... | G01P 13/045 73/170.04 |

(Continued)

*Primary Examiner* — Andre J Allen
(74) *Attorney, Agent, or Firm* — Brian R. Galvin; Galvin Patent Law, LLC

(57) ABSTRACT

A wind detection device of a generally bisected cylindrical-type shape with a flat face at the bisection, for attachment to other devices such as a hunting bow, having opaque or translucent walls formed of an impermeable material such as plastic where one end narrows down to an opening for a lid to attach to and seal device; and where lid narrows down further to another cylindrical-type shape with another, smaller opening for contents of device to exit through.

2 Claims, 4 Drawing Sheets

(56) References Cited

U.S. PATENT DOCUMENTS

2016/0069924 A1\* 3/2016 Norris ................... G01P 13/02
                                                                               73/170.04
2016/0282381 A1\* 9/2016 Ferrara, Jr. ......... G01P 13/0093
2017/0176490 A1\* 6/2017 Ferrara, Jr. ......... G01P 13/0093

\* cited by examiner

Fig. 4

HANDS-FREE ATTACHABLE WIND DETECTION DEVICE

CROSS-REFERENCE TO RELATED APPLICATIONS

This application is a continuation-in-part of U.S. patent application Ser. No. 16/045,664, titled "HANDS-FREE ATTACHABLE WIND DETECTION DEVICE", and filed on Jul. 25, 2018, which claims priority to U.S. provisional patent application Ser. No. 62/536,952, titled "HANDS-FREE ATTACHABLE WIND DETECTION DEVICE", which was filed on Jul. 25, 2017, the entire specification of each of which is incorporated herein by reference.

BACKGROUND OF THE INVENTION

Field of the Art

The disclosure relates to the field of wind detection in hunting, and more particularly to a hands-free, attachable wind detection device for bow hunting.

Discussion of the State of the Art

In the field of bow hunting, hunters often spend hours or days tracking their prey forgoing modern luxuries such as running toilets, showers, clean shaves, or fresh laundry. This generally leads to a very dirty and smelly hunter tracking an animal such as deer, which is a very scent-sensitive creature. Wind direction can make or break a hunt; if a smelly hunter is positioned upwind of his prey, his scent can tip off his prey and run away thus ending a long hunting trip with no reward.

Hunters then have a need for wind speed and direction detection. Common wind detectors are a simple squeeze bottle with talcum powder that can be kept in the hunters' pockets. This remedy requires the hunter to remove his hand from the bow, reach into the pocket, grab the bottle, pull it out of the pocket, squeeze it, and then place the bottle back into the pocket before he places his hand back on his bow to position his arrow. Any one of these movements can spook the prey and end the hunt with no reward.

What is needed, is a means to provide a wind detection device that attaches directly to the bow and remains attached; eliminating the need for a hunter to take his hands off the bow as well as eliminating any unnecessary movements that could scare off the prey.

SUMMARY OF THE INVENTION

Accordingly, the inventor has conceived and reduced to practice, in a preferred embodiment of the invention, a device for an attachable wind detector that affixes directly to a hunter's bow removing need for unnecessary hand movements.

In a preferred embodiment of the invention, a wind detection device may comprise a generally bisected cylindrical-type shape with a flat face at the bisection, for attachment to other devices such as a hunting bow, having opaque or translucent walls formed of an impermeable material such as plastic where one end narrows down to an opening for a lid to attach to and seal device; and where lid narrows down further to another cylindrical-type shape with another, smaller opening for contents of device to exit through.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 4 is an illustration of an exemplary wind detection device according to a preferred embodiment of the invention, illustrating use of wind detection device attached to surface of a hunting bow.

DETAILED DESCRIPTION

Detailed Description of Exemplary Embodiments

Figure 1:
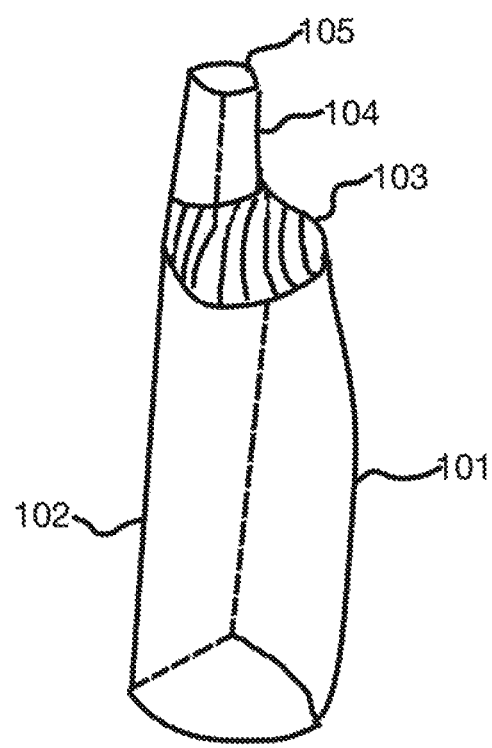
FIG. 1 is an illustration of an exemplary wind detection device according to a preferred embodiment of the invention, illustrating device design for attachment.

FIG. 1 is an illustration of an exemplary wind detection device according to a preferred embodiment of the invention, illustrating device design for attachment 100.

According to the embodiment, a wind detection device 100 may comprise a generally bisected cylindrical-type shape 101 (generally, a bisected cylindrical-type shape to be assembled as illustrated; however, it should be appreciated that other final shapes may be used according to a desired arrangement or use case, such as an elliptical-type shape, or an oval-type shape, or a circular-type shape, or other arrangement) with flat face 102 along the bisection for attachment to surfaces such as a hunting bow (however, it should be appreciated that device may attach to other surfaces such as longbows, guns such as rifles for rifle hunting, or string spools for kite flying, hat or visor or other devices according to a preferred arrangement or use case). Wind detection device 100 may have opaque, semi-translucent, or translucent walls 101, 102 formed of an impermeable material such as plastic (however, it should be appreciated that other materials may be used to form device walls such as (PP) Polyhigh-density polyethylene (HDPE), low-density polyethylene (LDPE), post-consumer resin (PCR), or plastic-like substances such as silicone, or polyesters such as polyethylene terephthalate (PET), or other materials according to a preferred arrangement or use case); formed where one end of device 100 narrows down to form an opening (mouth) where a lid 103 may attach to and subsequently seal device 100; and where lid 103 narrows down further to another cylindrical-type shape or conical-type shape 104 with another, smaller opening (mouth) 105 for detector contents of device to exit through when device 100 is in use.

Figure 2:
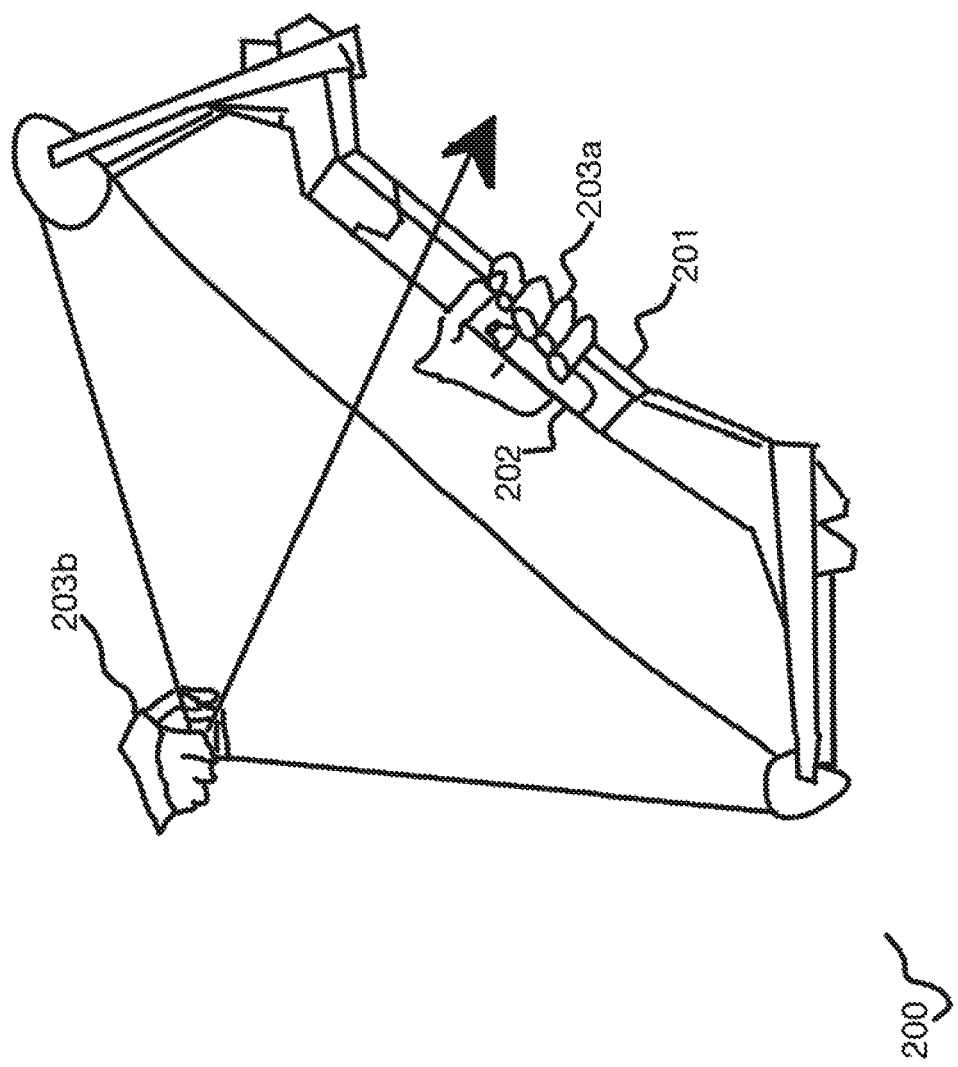
FIG. 2 is an illustration of an exemplary wind detection device according to a preferred embodiment of the invention, illustrating a hunting bow with wind detection device attached.

FIG. 2 is an illustration of an exemplary wind detection device according to a preferred embodiment of the invention, illustrating a hunting bow 200 with wind detection device attached. According to the embodiment, wind detection device 202 attaches directly to hunting bow 201 via an adhesive-type substance such as heavy-duty, double-sided tape (however, it should be appreciated that other adhesive substances may be used such glues, resins, strip adhesives, or other adhesives according to a preferred arrangement or use case). Adhesive is placed between desired surface location of hunting bow 201 and bisected flat surface 102 of device 202. Device 202 may be placed anywhere on hunting bow 201 according to a desired arrangement or use case of the embodiment; if device 202 is attached to hunting bow 201 near grip where hand 203a holds hunting bow 201, then hand 203a may tap or press device 202 to release detector contents such as talcum powder (generally talcum powder is used for wind detection; however, it should be appreciated that other detector contents may be used inside device such as construction chalk, baking powder, corn starch, milkweed seed pods, or micro-balloons, or other contents according to a preferred arrangement or use case), and thereby preventing the need for hand 203a to be removed from hunting bow 201 to retrieve device 202 from within hunter's pockets or bag. Attaching device 202 to hunting bow 201 also prevents need to remove hand 203b from string of hunting bow 201 which also prevents the need to reset any parts of hunting bow 201 (such as resetting an arrow).

Figure 3:
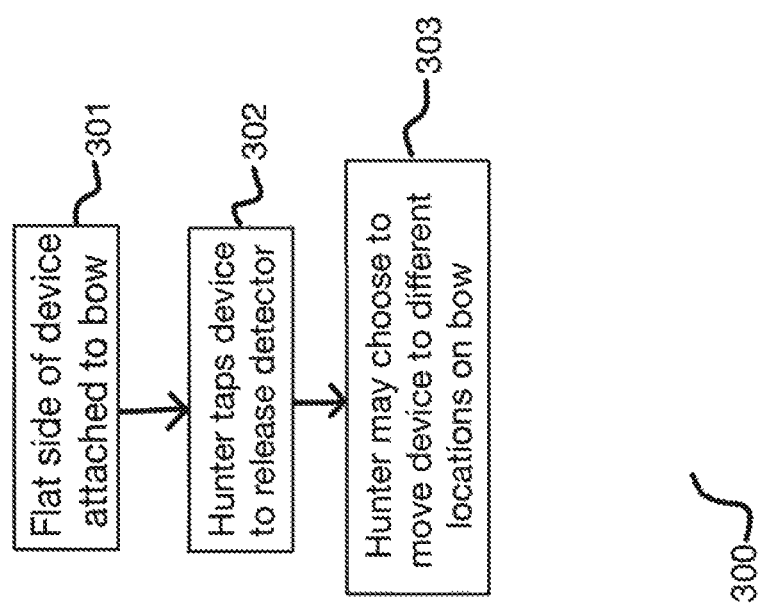
FIG. 3 is an illustration of an exemplary method diagram according to a preferred embodiment of the invention, illustrating use of wind detection device.

FIG. 3 is an illustration of an exemplary method diagram according to a preferred embodiment of the invention, illustrating use 300 of hands-free attachable wind detection device. In a first step, hands-free wind detection device is attached to hunting bow surface 301 along bisected flat side of device with a strong adhesive. In a next step, hunter taps or presses device to release detector contents 302 such as talcum powder into the air for wind detection. Detector contents leave device through a small opening at the top of device and float in direction of wind as well as float with the wind speed. In an optional step, hunter may choose to reattach device 303 to a different position along bow.

Figure 4:
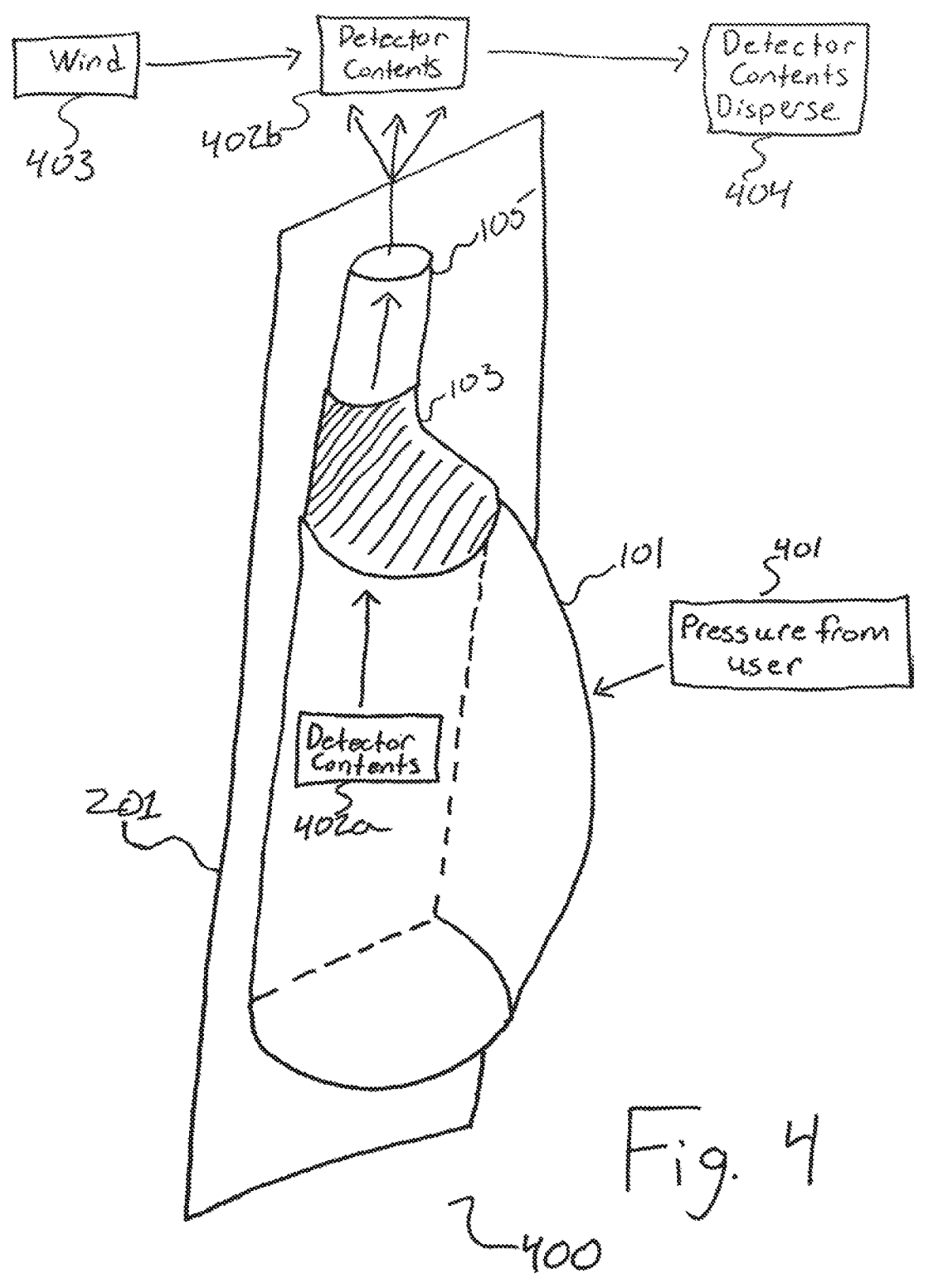

FIG. 4 is an illustration of an exemplary wind detection device according to a preferred embodiment of the invention, illustrating use 400 of wind detection device attached to surface of a hunting bow. Device 101 attaches to surface of hunting bow 201 via an adhesive placed between bisected flat surface of device 101 and surface of hunting bow 201. Detector contents 402a such as talcum powder are contained within device 101. User of device 101 such as a hunter, may apply pressure 401 to device 101 walls that are not attached to surface of hunting bow 201. The pressure 401 from user pushes device 101 walls in towards the bisected wall, thereby squeezing detector contents 402a within device 101. Detector contents 402a move from the applied pressure 401 of device 101 walls and move upwards through lid 103 and continue upward through mouth 105 of device 101. Once outside of device 101, detector contents 402b may then be subjected to wind 403; wind 403 pushes detector contents 402b along wind 403 path and thereby disperses detector contents 404. According to how detector contents 402b are dispersed 404, hunter will have a notion of which way their scent is floating with the wind 403 and will be able to make more accurate decisions regarding hunting. If there is little to no wind 403, detector contents 402b may disperse 404 by falling to the ground, hanging in the air, or gently floating around or away.

The skilled person will be aware of a range of possible modifications of the various embodiments described above. Accordingly, the present invention is defined by the claims and their equivalents.

What is claimed is:

1. A hands-free attachable wind detection device, comprising:
   a bisected cylindrical-shape bottle device comprising a flat face, a mouth opening, and a removable lid attachable over the mouth opening and comprising a tapering passageway from a proximal end adjacent to the mouth opening to a distal end;
   wherein the bottle device is formed from an impermeable material; and
   wherein the bottle device is attachable to a hunting bow with an adhesive on the flat face;
   wherein upon pressure being placed on a curved exterior surface of the bottle device, powder is forced through the mouth opening and the lid into the atmosphere.

2. The apparatus of claim 1, wherein the device attached to an apparatus such as a hunting bow, and is operable without removing hands from the hunting bow.

* * * * *